C. FELL.
METHOD OF AND APPARATUS FOR EXPANDING AND STRAIGHTENING PIPE ENDS.
APPLICATION FILED AUG. 9, 1920.

1,431,883.

Patented Oct. 10, 1922.

INVENTOR
Charles Fell
by D. Anthony Usina
Attorney

C. FELL.
METHOD OF AND APPARATUS FOR EXPANDING AND STRAIGHTENING PIPE ENDS.
APPLICATION FILED AUG. 9, 1920.

1,431,883.

Patented Oct. 10, 1922.

INVENTOR
Charles Fell
by D. Anthony Usina
Attorney.

C. FELL.
METHOD OF AND APPARATUS FOR EXPANDING AND STRAIGHTENING PIPE ENDS.
APPLICATION FILED AUG. 9, 1920.

1,431,883.   Patented Oct. 10, 1922.
7 SHEETS—SHEET 6.

INVENTOR
Charles Fell
by D. Anthony Usina
Attorney

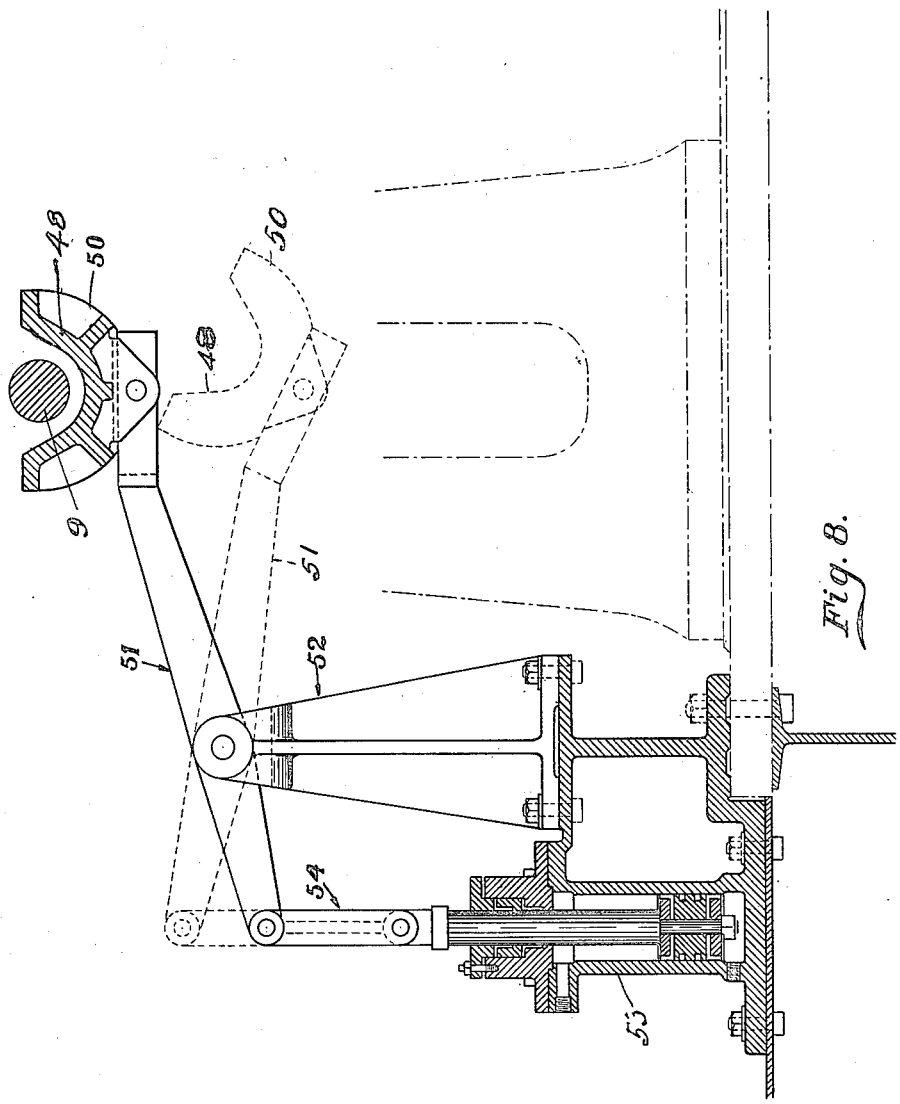

Patented Oct. 10, 1922.

1,431,883

UNITED STATES PATENT OFFICE.

CHARLES FELL, OF LORAIN, OHIO, ASSIGNOR TO NATIONAL TUBE COMPANY, OF PITTSBURGH, PENNSYLVANIA, A CORPORATION OF NEW JERSEY.

METHOD OF AND APPARATUS FOR EXPANDING AND STRAIGHTENING PIPE ENDS.

Application filed August 9, 1920. Serial No. 402,335.

*To all whom it may concern:*

Be it known that I, CHARLES FELL, a citizen of the United States, and resident of Lorain, in the county of Lorain and State of Ohio, have invented certain new and useful Improvements in Methods of and Apparatus for Expanding and Straightening Pipe Ends, of which the following is a specification.

My invention relates to straightening welded pipes and tubes. The invention is particularly adapted for use in straightening the ends of pipes (by which term the term tubes is also to be included throughout the specification) made by the lap-weld method. In forming lap-welded pipes and tubes the skelp after being scarfed is then heated to a welding temperature. The heated skelp is pushed from the welding furnace and caused to pass through the welding rolls, between which is placed a welding ball supported by a welding bar or mandrel. After the welding operation the pipe is subjected to a second rolling operation in which the pipe is made of uniform diameter or sized. The sized pipe is then conveyed to cross rolls by which the pipe is straightened. The pipe after being cooled is in readiness for screw-threading, or such further operations as adapt it to its special uses.

It frequently happens that in the welding operation the end of the pipe which issues first from the welding rolls is so distorted as to be of a lesser diameter than the remainder of the pipe. When this occurs, a subsequent screw-threading operation will not provide the pipe with even and fully formed threads, but in such case the threads on the constricted portion of the pipe will be imperfectly formed and have flattened places, constituting what are known as black threads. In order, therefore, to avoid the formation of such imperfect threads, the constricted portion of the pipe must be cut off before the screw-threading operation, thus increasing the scrap loss.

The object of the present invention is to provide a method and apparatus by means of which the end of the pipe, first formed, may be expanded to a diameter the same as that of the remainder of the pipe.

Further, and more specific, objects of the invention, are to expand the small end of the pipe while it is at a high temperature, to simplify the apparatus requisite, and to make the expanding operation automatic, and perform it in such conjunction with the welding and other steps, that time and labor are economized.

Referring now to the drawings, forming part of this specification, Figure 1 is a plan showing apparatus for making lap-weld pipe embodying my invention.

Figure 8 is a sectional end elevation on the line VIII—VIII of Figure 7.

Figure 1:
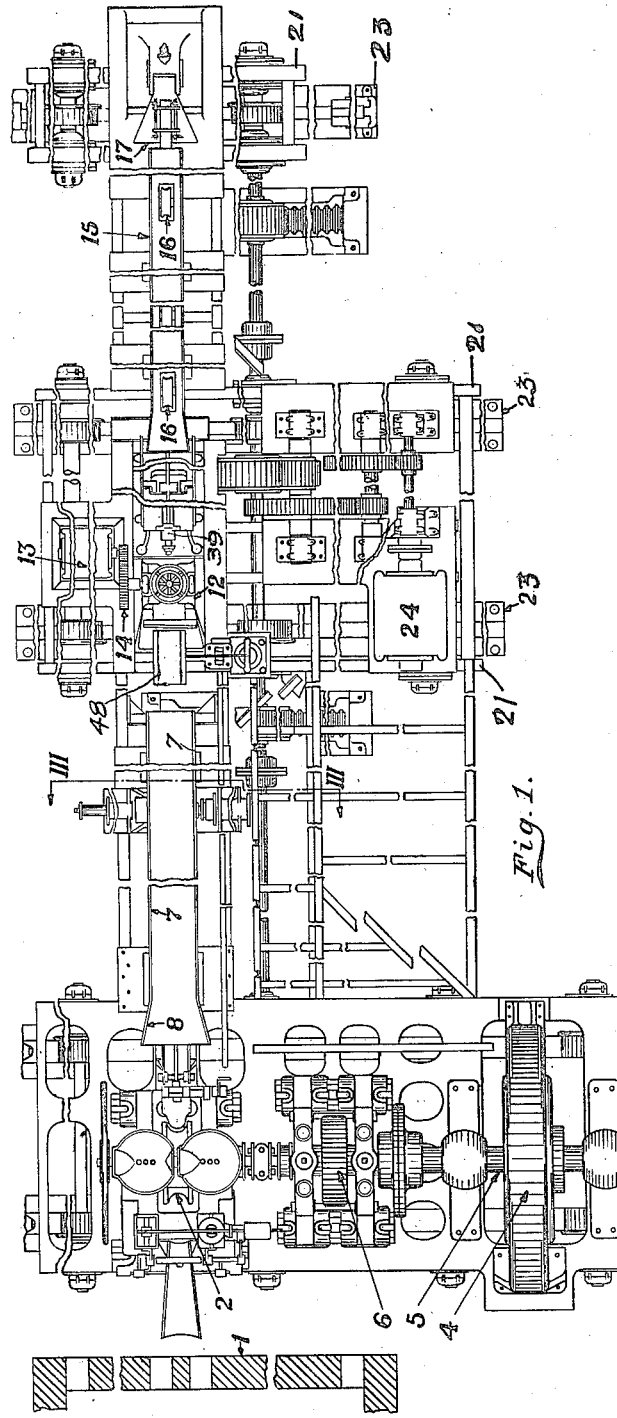
Figure 2:
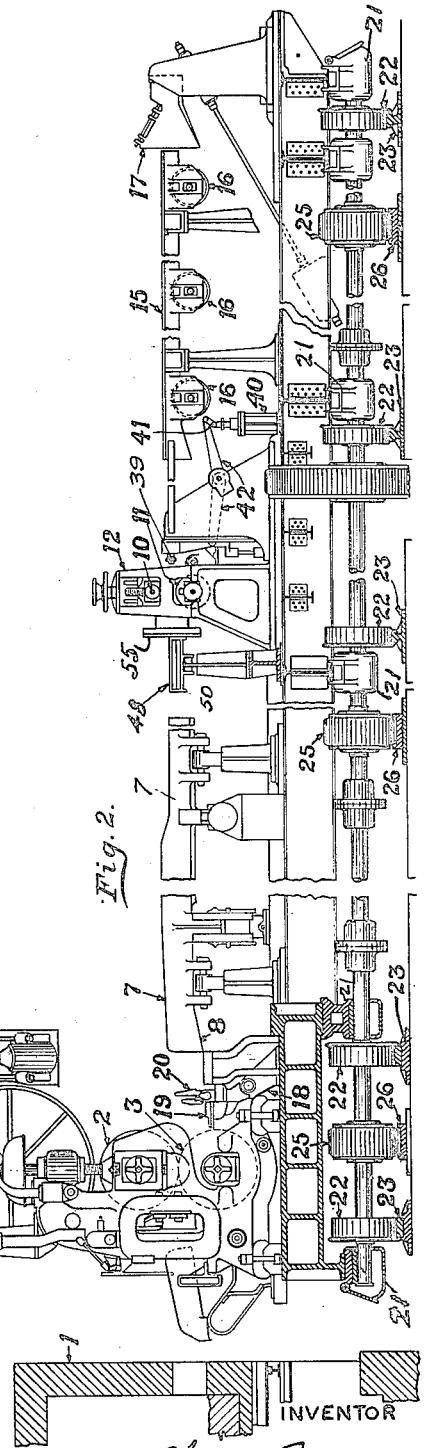
Figure 2 is a sectional side elevation of the apparatus of Figure 1.
Figure 3:
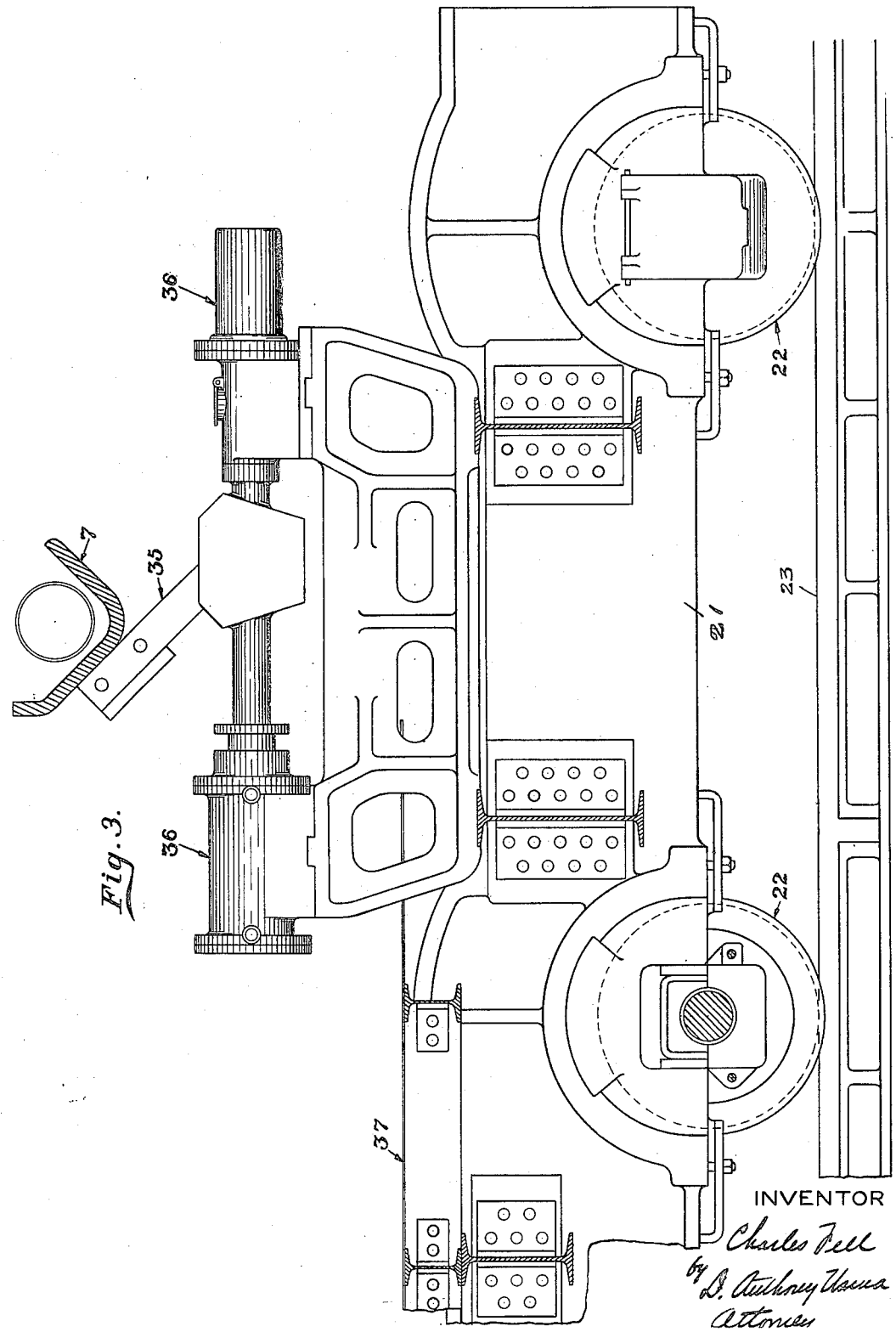
Figure 3 is a sectional end elevation on a larger scale, the section being taken on the line III—III of Figure 1.
Figure 4:
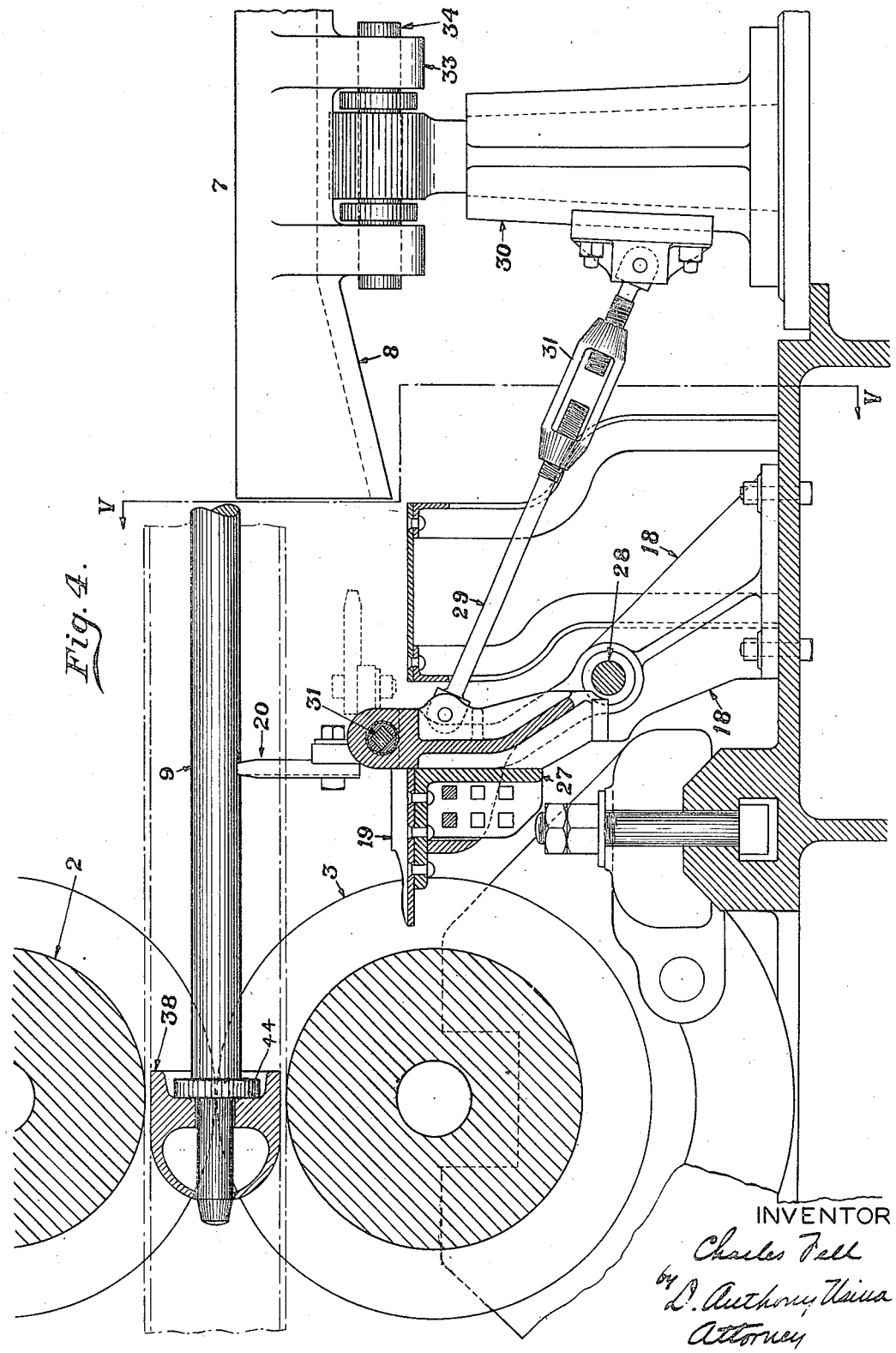
Figure 4 is a sectional side elevation showing a portion of the apparatus of Figures 1, 2, and 3 at the welding rolls end of the apparatus.
Figure 5:
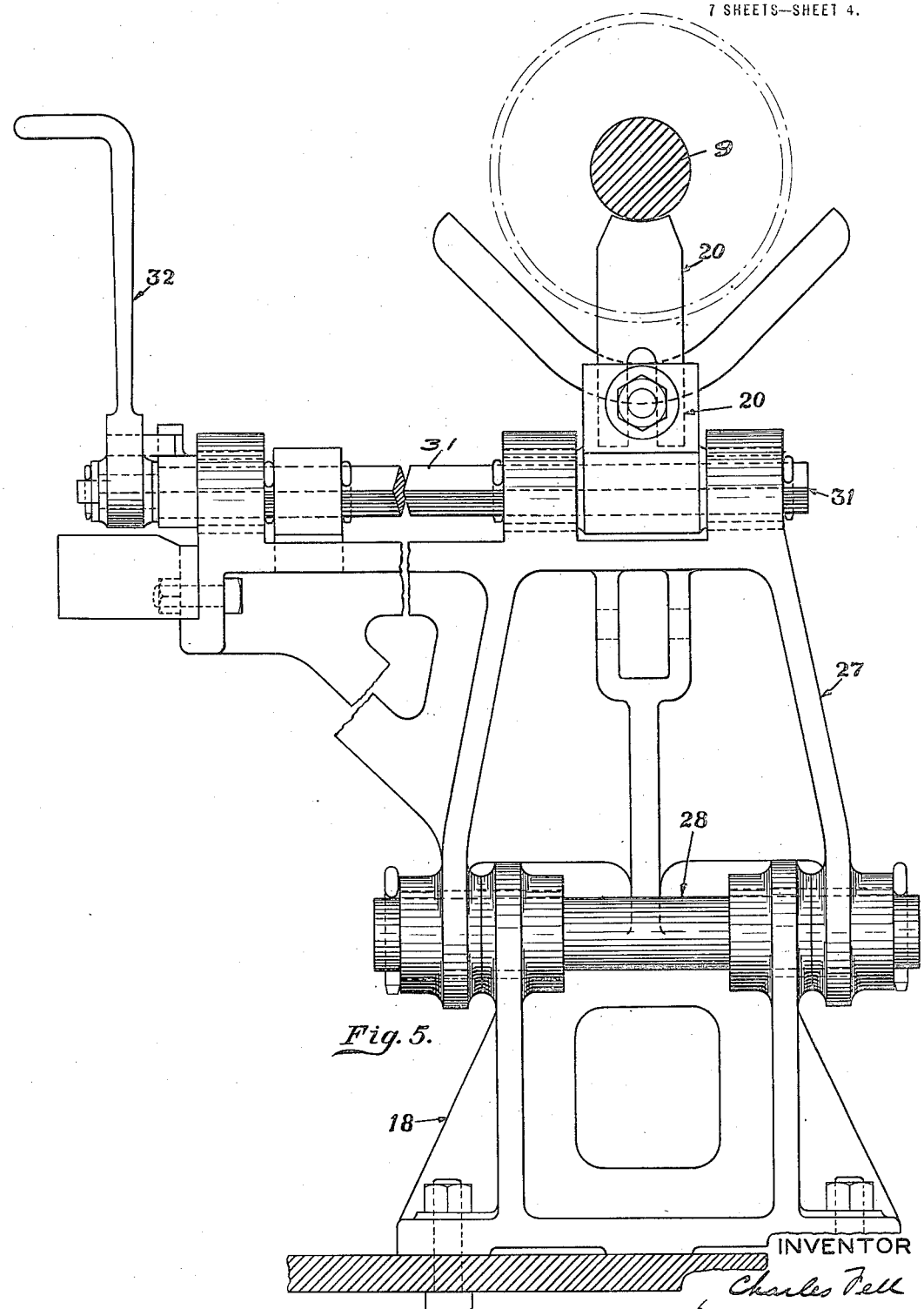
Figure 5 is a sectional end elevation on the irregular line V—V of Figure 4.

In the accompanying drawings, the numeral 1 designates the furnace from which the skelp is drawn to the welding rolls 2 and 3, the rolls being actuated by means of a motor 4 connected with the rolls by means of a shaft 5 and driving pinions 6. Rearwardly of the welding rolls is located a trough 7, arranged to receive the pipe and having a belled forward portion 8.

The welding bar or mandrel 9 lies in the trough 7, and in its forward, or operative, position, with its forward extremity between the welding rolls. It is gripped for longitudinal movement by grooved rolls 10 and 11 mounted in the standard 12 and actuated by a motor 13 through reducing gearing 14. In its rearward or inoperative position, the welding bar lies in a relatively shallow trough 15 to the rear of the bar puller. This trough is provided with idler rolls 16 to facilitate progress of the bar therealong, and at its rearward extremity is mounted a stop 17 to limit rearward movement of the bar. Immediately to the rear of the welding rolls 2 and 3 and between them and the belled forward extremity of the trough 7 is the standard 18 supporting the welding ball catcher 19, and latch 20. The entire machine is movable laterally into and out of position in line with the welding furnaces by being mounted upon a plurality of trucks 21, the wheels 22 of which run on tracks 23 on the mill floor. The propelling power for the whole is furnished by a motor 24 actuating rack wheels 25 which engage the laterally disposed racks 26. The method of propulsion causes all portions of the machine to travel smoothly and at the same rate of speed.

The welding ball catcher 19 is bolted to the frame 27, which is rotatably mounted on the shaft 28 having bearings in the standard 18 and which also carries the latch 20 for supporting the welding bar. By swinging the frame 27 on the shaft 28, the position of the ball catcher and latch may be so adjusted as to be in proper position relatively to rolls of varying sizes for the welding of pipes of larger or smaller diameter. The frame 27 is secured in position by means of a stay rod 29, secured at its other extremity to one of the standards 30 for supporting the trough 7 and provided with a turnbuckle 31 to permit it to be adjusted to different positions of the frame on the standard 18.

The latch 20 is rigidly secured to a shaft 31, having bearings in the frame 27 and provided with a manually operable handle 32 by means of which the latch may be raised into position to support the bar. It is in general forced into its lowered position (shown in dotted lines) by the pipe itself as the pipe issues from the welding rolls, but may be lowered manually if so desired.

The trough 7 is made tiltable by means of the arms 33 which engage the short shafts 34 rotatably mounted in the standards 30. The tilting of the trough is performed by the lever arm 35 actuated by pressure cylinders 36. At the side of the trough 7 are skids (not shown) arranged to receive the pipes discharged from the trough. When in position for the welding of a pipe, the welding bar or mandrel 9 lies in the trough 7, supported adjacent the rolls by the latch 20, and bearing at its end, between the rolls, a welding ball 38. In this position, the rearward extremity of the welding bar is in contact with the stop 39 which may be adjusted vertically by means of the pressure cylinder 40, links 41, and lever arm 42.

In making pipes by the means described above, the pipe is formed in the welding rolls 2 and 3 and around the welding ball 38. The first formed end of the pipe as it issues from the rolls, forces the latch 20 into its lowered, or inoperative position, and the pipe as it is welded is forced along the trough 7 by the welding rolls, the pipe itself surrounding the mandrel or welding bar and supporting it and the welding ball in position. The welding bar is prevented from being forced backwardly by the stop 39 against which its rearward extremity rests. When the pipe is completely welded and its last formed end has passed from the rolls the forward end of the mandrel drops and the welding ball, which is loosely supported on the bar, drops or is struck from the end of the bar onto the ball catcher 19. The progress of the pipe itself is checked by any suitable stop arranged to permit passage of the welding bar therethrough, the adjustable stop 39 is then lowered, and the welding bar withdrawn from the pipe, permitting the pipe to be discharged onto the skids by tilting the trough 7.

The first formed end of the pipes thus made however, are in a large number of instances, so distorted in the rolls as to render them of a diameter materially less than that of the remainder of the pipe. In order, therefore, to render the pipes so approximately uniform in diameter that they may be made uniform in the sizing rolls, special steps and apparatus are provided for expanding this smaller, first formed, end of the pipe.

Figure 6:
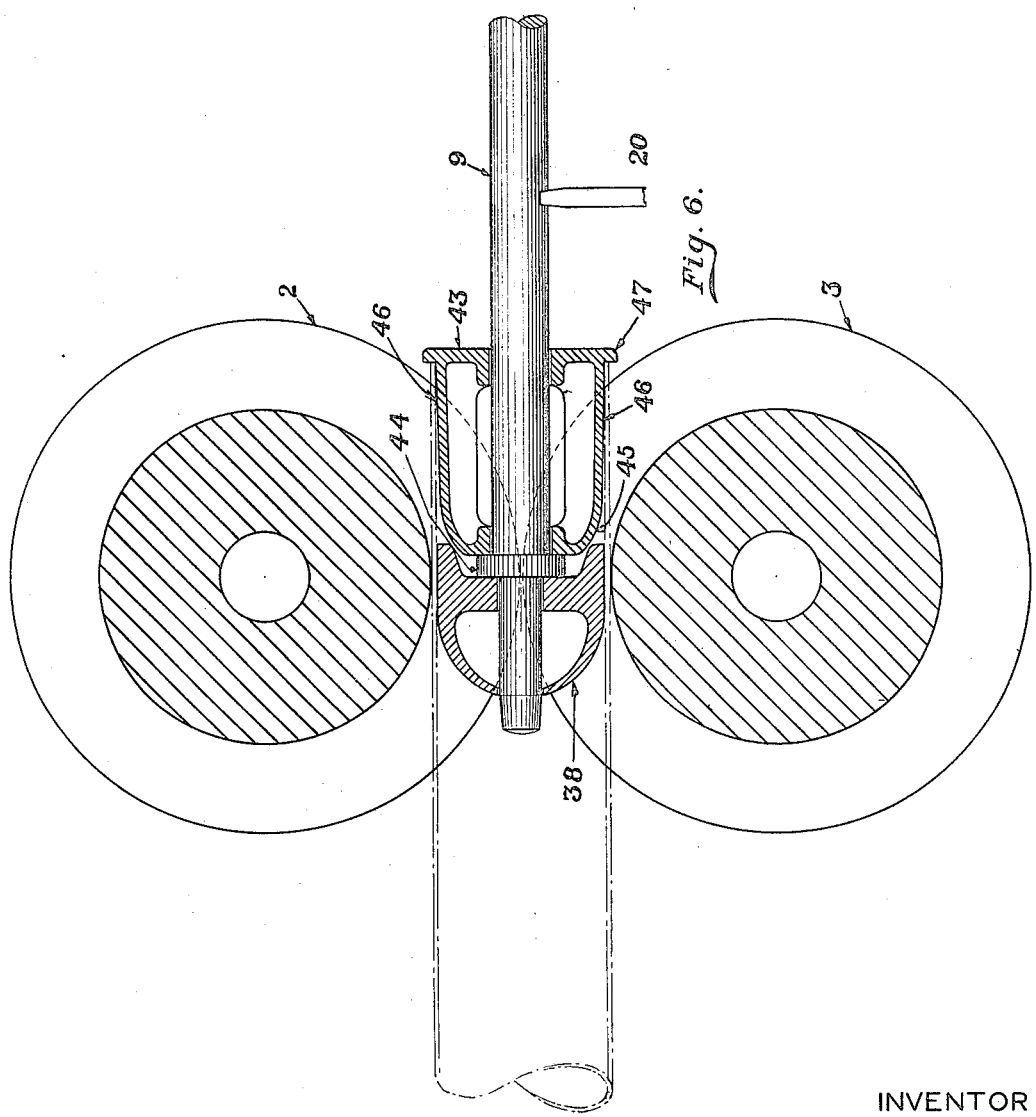
Figure 6 is a sectional side elevation showing the welding ball and expanding ball as positioned relative to the welding rolls at the commencement of the pipe welding operation.
Figure 7:
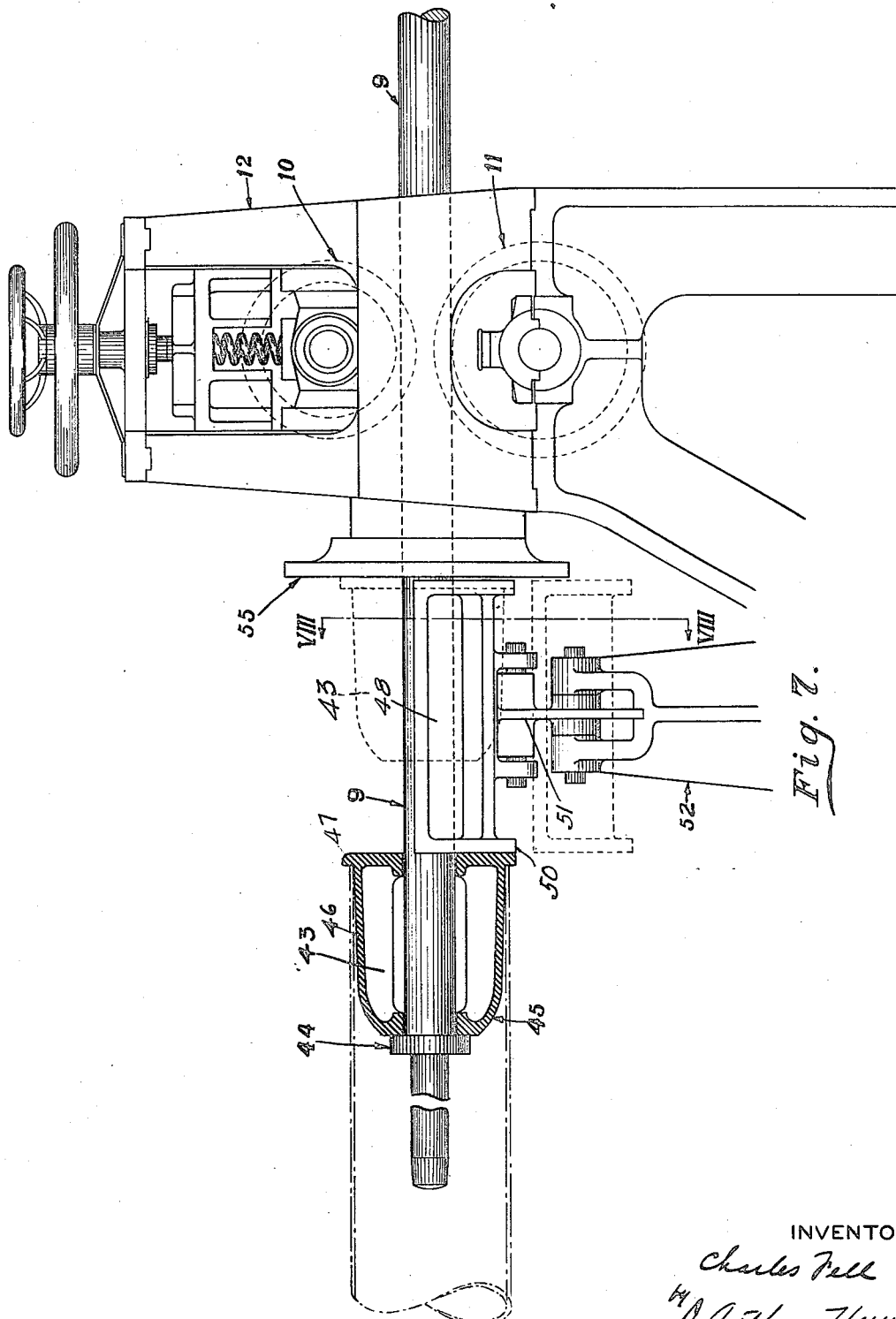
Figure 7 is a side elevation, partly in section, showing a portion of the apparatus at the bar puller end of the apparatus.

To this end, the expanding plug 43 is mounted slidably on the welding bar or mandrel 9, and when in operative position, as shown in Figure 6, lies immediately behind the welding ball 38, and shoulder 44 on the mandrel, in position to enter and expand the first formed end of the pipe immediately upon its formation. The plug 43 is made with a short, sharply tapered forward portion 45, and a relatively long cylindrical portion 46 of substantially uniform diameter throughout extending back to the shoulder 47. The portion 46 of the plug is of the same or only slightly lesser diameter than the proper diameter of the body of the pipe and this, as well as the design of the plug with a relatively short tapered portion, is rendered possible by the positive method of withdrawing the plug from the pipe hereinafter described.

As the first formed end of the pipe being welded issues from the rolls, it is forced over the expanding plug 43 until the edge of the pipe comes in contact with the shoulder 47 of the plug. From then on the plug remains in the end of the pipe and slides along the welding bar as the pipe issues from, and is forced along by the welding rolls until the entire pipe has passed from the rolls and lies in the trough 7. Further progress of the pipe is then arrested by the movable stop 48, which is so formed as to provide a short movable trough for the welding bar and has a flange 50 for contacting with the expanding plug. The stop 48 is rendered movable into and out of operative position by being mounted on the lever arm 51, pivoted on the standard 52, and actuated by means of the pressure cylinder 53 connected through link 54.

In order to withdraw the expanding plug and welding bar from the pipe, the adjustable stop 39 is lowered, and the movable stop 48 moved into its inoperative, or dotted line position, leaving the pipe at the desired fixed distance from the striking face 55 of the bar puller 12. The grooved pinch rolls 10 and 11 of the bar puller are actuated to draw the welding bar from the pipe. When the shoulder 44 of the bar comes in contact with the expanding plug, the plug is pulled from the end of the pipe and carried along with the bar until it comes in contact with the striking face 55 of the bar puller or pinch rolls. With the plug and welding bar removed, the pipe may be discharged from the trough 7 by tilting the latter, as has previously been described, as the end of the bar will be clear of the end of the welded pipe.

When the pipe has been discharged from the trough, the welding bar and expanding plug are restored to operative position by the grooved pinch rolls of the bar puller. It sometimes happens that in returning the welding bar to position, the expanding plug will drag in the trough 7 sufficiently to cause it to be forced backwardly a short distance on the welding bar, if the expanding plug is designed for pipes of large diameter, it may be brought into proper position by continuing the forward movement of the bar until the expanding plug lies in the belled portion 8 of the trough, when the action of the rolls is reversed and the bar drawn backwardly until its shoulders 44 again comes in contact with the plug. If the apparatus is designed for use in making pipe of small diameter, the adjustment may be made by hand.

By means of the invention described above, the first formed end of a pipe is expanded during the continuance of the welding operaton, and the impulse of the welding rolls themselves serves to force the first formed or small end of the pipe over an expanding member. The method of expanding the end of the pipe is so correlated with the formation of the pipe that the progress of the pipe is continuous and uninterrupted, there being no necessity for arresting this progress in order to perform the step of expanding the small end of the pipe. The special expanding apparatus enters so into combination with that utilized in the welding and handling of the pipe that it is simple in its construction and in no way interferes with the general method employed. The positive method of withdrawing the expanding member from the end of the pipe after its complete formation permits this member to be made of such size and form as to produce a maximum expanding effect.

A number of modifications may be made in both the method and apparatus employed, and therefore, no limitations to the scope of the invention, other than those contained in the appended claims, are to be imposed.

I claim:—

1. The method of forming pipes or tubes of substantially uniform diameter which consists in passing the skelp into welding rolls and over a welding ball mounted on a mandrel, forcing the first formed end of said pipe or tube over an expanding plug during and without interrupting the welding of the remainder of said pipe or tube, stopping the travel of said pipe or tube, removing the welding ball from the last welded end of the pipe or tube, then withdrawing the mandrel and expanding plug from the first welded end of the pipe or tube, then moving the pipe or tube transversely out of line with the welding apparatus, and finally returning said mandrel and expanding plug into position to receive the next pipe or tube and mounting the welding ball on the receiving end of the mandrel, all substantially as and for the purpose described.

2. In apparatus for making welded pipes or tubes, the combination of welding rolls, a mandrel, a welding ball removably mounted on said mandrel, and an expanding plug which is longitudinally movable on said mandrel, said plug having an annular shoulder at its rear end against which the welded pipe is adapted to abut.

3. In apparatus for making welded pipes or tubes, the combination of welding rolls, a mandrel, a welding ball removably mounted on said mandrel, means for advancing and withdrawing said mandrel relatively to the welding rolls, and an expanding plug longitudinally movable on said mandrel, said plug comprising a short, sharply tapered nose portion, and a relatively long cylindrical body portion of substantially uniform diameter terminating at its rear end in a stop shoulder against which the tube or pipe is adapted to abut.

4. In apparatus for making welded pipes or tubes, the combination of welding rolls, a welding ball supported in position between said rolls, an expanding plug mounted in operative relation to said rolls and arranged to enter the end of the pipe or tube as formed, a movable stop arranged to arrest the movement of the pipe or tube at the completion of the welding operation, and means for withdrawing the expanding plug from the end of said pipe or tube.

5. In apparatus for making welded pipes or tubes the combination of welding rolls, a mandrel, a welding ball on said mandrel, means for advancing and withdrawing said mandrel relatively to said welding rolls, an expanding plug on said mandrel, and a movable stop arranged to arrest movement of said pipe or tube and to be removed from operative position for withdrawal of the expanding plug from the pipe or tube.

In testimony whereof, I have hereunto set my hand.

CHARLES FELL.